Sept. 18, 1934.  W. A. SERIGHT  1,974,346
VINE CUTTER
Filed Feb. 15, 1934   2 Sheets-Sheet 1

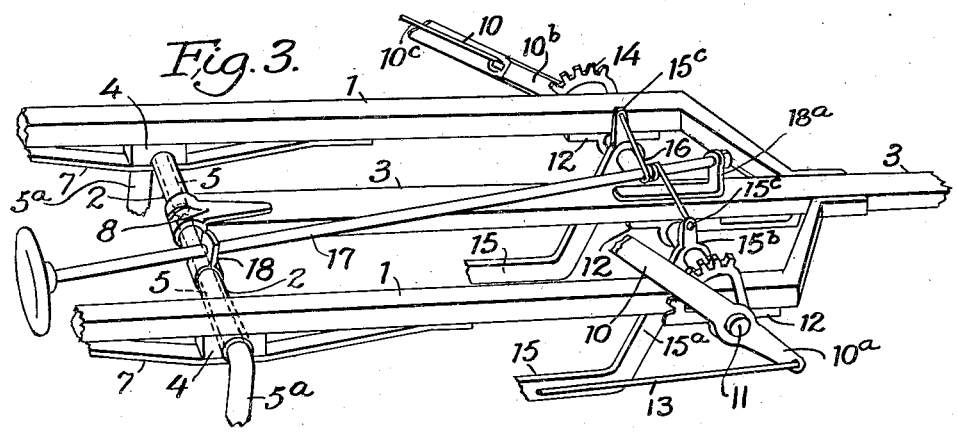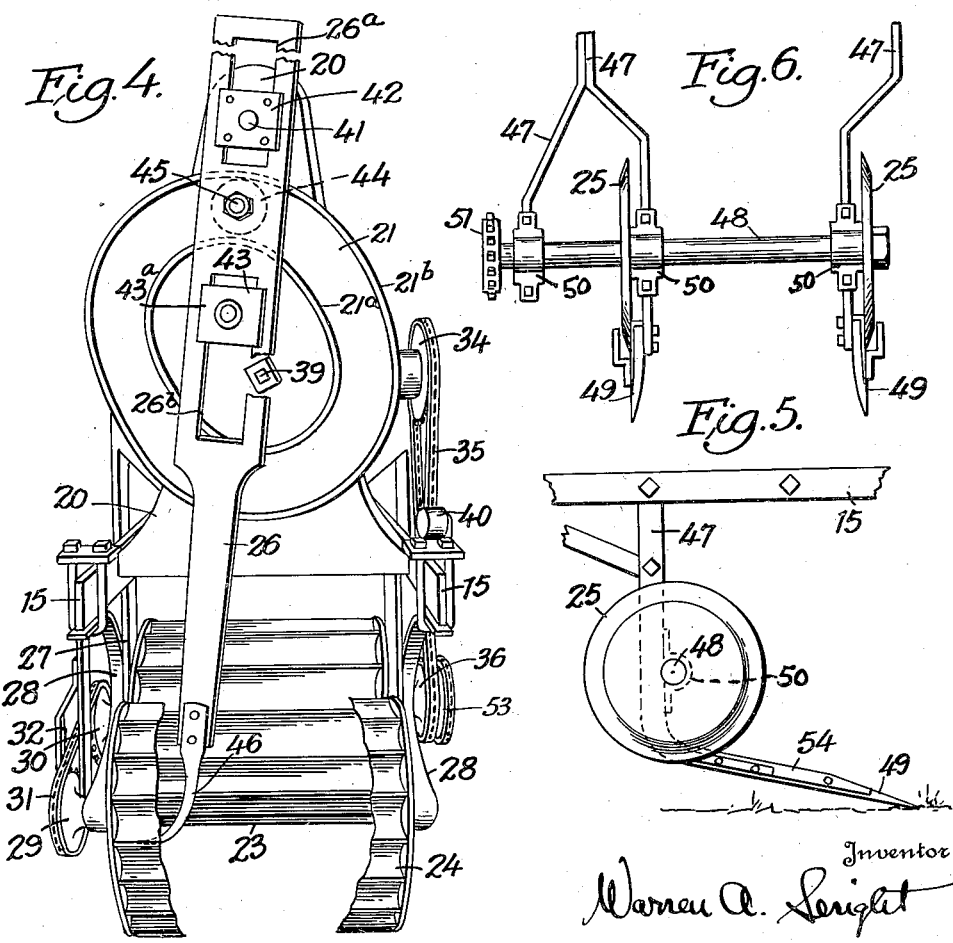

Patented Sept. 18, 1934

1,974,346

UNITED STATES PATENT OFFICE 1,974,346

VINE CUTTER

Warren A. Seright, Fruitland, Iowa

Application February 15, 1934, Serial No. 711,408

20 Claims. (Cl. 55—64)

This invention is an improvement in vine cutting machines, especially adapted for cutting sweet-potato vines. The machine disclosed in the present application is an improvement in the machine shown in my U. S. Letters Patent No. 1,857,006, dated May 3, 1932, which patented machine cuts the vines longitudinally along opposite edges of a row and directs the cut vines inwardly into the path of a transverse cutting knife disposed between a pair of ground rollers which hold the vines upon the ground surface during the transverse cutting operation.

The principal object of my present invention is to provide a machine comprising a wheeled supporting frame in which each side may be raised or lowered to adjust the height; and a cutter frame laterally adjustably mounted on the supporting frame, the cutter frame carrying the mechanism for operating the cutting knife, and having corrugated ground rollers for holding the vines in position for cutting, the ground rollers also furnishing the traction for operating the cutting mechanism. In my aforesaid patent the wheels of the supporting frame were utilized to operate the cutting knife through a differential drive; while in the present application a simplified bevel gear drive is utilized.

A further object is to provide a novel rotary cam cooperating with a roller on the cutting knife arm for positively controlling the action of the knife.

A further object is to provide a laterally slidable connection between the forward end of the cutting frame and the cultivator frame operated by a manually rotated shaft, for the purpose of moving the cutting frame from side to side with respect to the cultivator frame to take care of uneven rows of vines.

A further object is to provide a simplified bowed spring connection for the rear ground roller of the cutting frame to allow a yielding contact with the ground.

A still further object is to provide longitudinal fingers extending in front of and downwardly from the cutter frame so that their outer ends go under the vines; also to provide changeable cutting blades mounted on the longitudinal fingers, said blades cutting most of the cross-vines on each side of the row as they slide up the incline; also to provide circular longitudinal cutters cooperating with longitudinal cutting blades whereby as the vines slide up over the cutting blades most of the vines that lie crosswise of the rows are cut, and any that are not, are cut by the circular longitudinal cutters.

A still further object of the invention is the provision of a machine which in addition to the above and other advantageous features, is simple in construction, reliable and efficient in use, and may be adjusted to suit various conditions.

I will explain the invention with reference to the accompanying drawings which illustrate one practical embodiment thereof to enable others familiar with the art to adopt and use the same; and will summarize in the claims the novel features of construction and novel combination of parts for which protection is desired.

In the drawings:

Fig. 3 is a perspective view of the main frame.

Fig. 4 is an enlarged vertical sectional view showing the cam, knife, and operating parts.

Fig. 5 is an enlarged side elevation of the fingers, blades, and longitudinal cutters.

Fig. 6 is a front elevation of the parts shown in Fig. 5.

Figure 1:
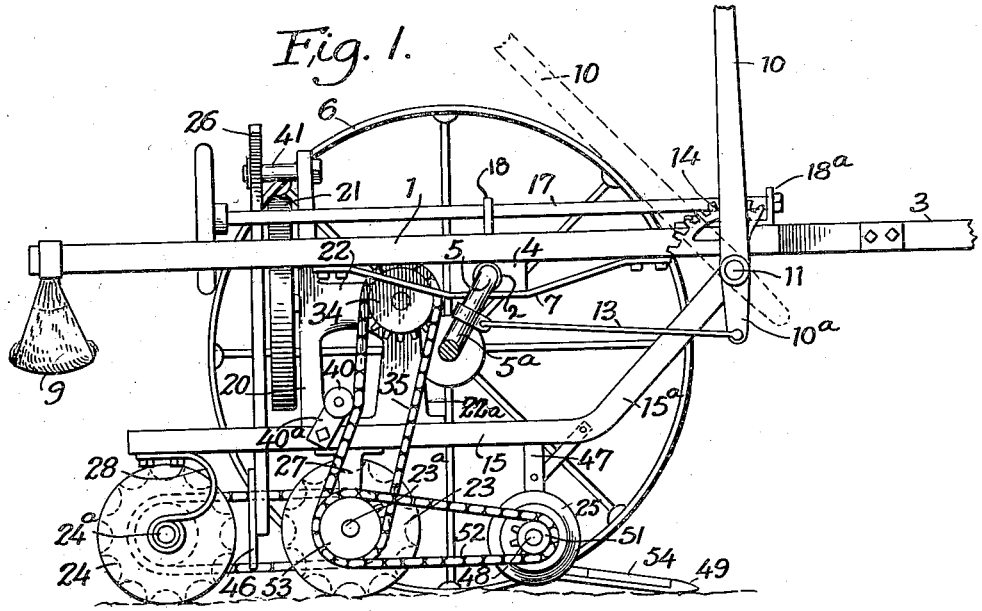
Fig. 1 is a side elevation of a vine cutting machine constructed in accordance with my present invention, the near rear wheel of the cultivator frame being removed.

As shown in the drawings, wherein the reference characters denote corresponding parts, the machine comprises a main frame similar to a riding cultivator frame consisting of spaced parallel side members 1 having at their forward ends inwardly inclined portions connecting the members with the tongue 3 of the main frame. Mounted in blocks 4 secured to the underside of frame members 1, is an axle housing 2 containing aligned axle sections 5 having offset ends 5a carrying at their outer ends the main wheels 6 of the main frame. Preferably brace straps 7 are secured under the side members 1 and under the bearings 4 to increase the rigidity of the side members. At the rear end of the side members is an operator's seat 9, attached in any desired manner.

Tongue 3 extends rearwardly to the axle housing 2, and carries a strap 8 which secures tongue 3 to housing 2. Axle sections 5 are journaled in the housing 2, whereby each axle section may be independently rotated for the purpose of raising or lowering either side of the cultivator frame independently of the other. Also the wheels 6 may be spaced wider apart to suit working conditions, independently of each other by sliding the axle sections 5 in the axle housing 2, any suitable means (not shown) being provided for securing the axles 5 in lateral adjustment.

The means for adjusting each axle section 5 comprises an adjusting lever 10 mounted upon a transverse rod 11 which is journaled in bearings 12 mounted on the undersides of the frame members 1 and the tongue 3, said adjusting lever 10 having a short arm 10a at its lower end connected by a link 13 with the offset portion 5a of its related axle section 5. A quadrant 14 is mounted adjacent each lever 10 for engagement with a sliding bolt 10b operated through a link 10c by a trigger 10d on the lever 10, whereby the inclination of the offset portion 5a may be adjusted to any desired position.

Laterally adjustably mounted upon the main frame is the cutter frame which consists of parallel side bars 15 spaced apart a distance less than side members 1 of the cultivator frame, said side bars 15 having their forward ends bent upwardly as at 15a and carrying aligned sleeves 15b which are slidably mounted upon the rod 11 of the main frame, whereby the cutter frame will be drawn by and with the main frame, but may pivot vertically on the main frame.

Sleeves 15b carry lugs 15c, and a flexible cable 16 is wrapped around a shaft 17 which is journaled in brackets 18 and 18a, the ends of cable 16 being fixedly secured to lugs 15c. The cable 16 at the center of the wrapping is fixed by a pin or the like to the shaft 17 whereby as the shaft is rotated the sleeves 15b shift, and hence the side members 15 of the cutter frame will be shifted laterally with respect to the main frame.

A spacer bar 19 connects the front ends of the side members 15 adjacent the sleeves 15b, the rear ends of the side members 15 being held spaced apart by the bracket 20 which supports the rear end of gear housing 22, and which supports the stud pin 41, hereinafter described.

The front and rear wheels or rollers 23 and 24 of the cutter frame are disposed under the rear ends of the frame members 15, and are preferably corrugated for the purpose of increasing the traction of the rollers which drive the mechanism operating the longitudinal cutters 25 and operating the reciprocating knife arm 26.

The front roller 23 is mounted in hangers 27 connected to the side members 15, said hangers carrying bearings for the shaft 23a which rotates with roller 23. The rear roller 24 is carried in bowed spring members 28, having their upper ends secured to the side members 15 and carrying bearings at their lower ends for shaft 24a which rotates with roller 24. The use of the bowed springs 28 permits a yielding contact for roller 24 with the ground.

Figure 2:
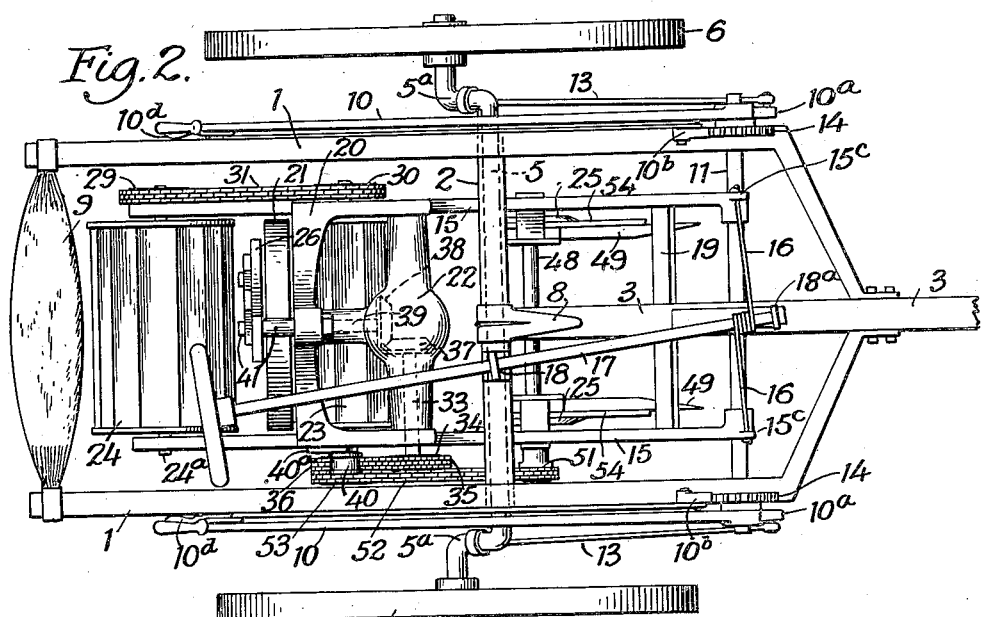
Fig. 2 is a top plan view.

Shaft 24a of the rear roller carries a sprocket 29 (Fig. 2), and shaft 23a carries a sprocket 30 around which runs a chain 31, so that both rollers 23 and 24 will furnish power for operating the cutter mechanisms hereinafter described. A suitable chain tightener 32 (Fig. 4) contacts with the lower run of the chain 31 raising the lower run of the chain to maintain the chain taut and to prevent the knife blade 46 from striking the chain when the knife leaves the ground in its backward or return stroke as hereinafter described.

Mounted upon the side members 15, above the roller 23, is a bracket casting 22a carrying gear housing 22. A shaft 33 disposed parallel with the rollers 23—24 is journaled in housing 22, said shaft carrying a sprocket 34. A chain 35 runs around the sprocket 34 and around a sprocket 36 on the shaft 23a whereby the shaft 33 will be driven positively by and with the rollers 23 and 24. Preferably a chain tightening roller 40, carried by a bracket 40a adjustably mounted on the side bar 15 adjacent chain 35, is provided for said chain.

On the inner end of shaft 33 is a bevel gear 37 (Fig. 2) meshing with a bevel gear 38 on inner end of a shaft 39 journaled in the housing 22 at right angles to shaft 33, said shaft 39 having on its outer rear end an eccentric cam 21 which rotates with shaft 39; and a stud pin 43a, secured on the eccentric cam 21 offset from the shaft 39, carries a slide bearing 43 slidably mounted in slot 26b of a knife arm 26 which operates the reciprocating knife 46 (Fig. 4). Bevel gear 38 of shaft 39 is preferably smaller than gear 37 of shaft 33 so that shaft 39 which operates the knife arm 26 will rotate faster than the rollers 23, 24.

In rear of the bracket casting 22a is a bracket 20 supporting the rear end of the gear housing 22. Bracket 20 extends above the gear housing 22 and on its upper end carries a stud pin 41, supporting a slide bearing 42 (Fig. 4) mounted in a slot 26a in the upper end of knife arm 26. Knife arm 26 also carries a slot 26b above referred to in which is mounted slide bearing 43 which is carried by the stud pin 43a on the eccentric cam 21, whereby as shaft 39 is rotated the knife arm 26 will be swung from side to side by the eccentric cam 21, said arm 26 being also pivoted on the slide bearing 42 at its upper end.

The knife arm 26 is raised and lowered to follow its desired orbit by means of an anti-friction roller 44 secured to the knife arm 26 by a bearing stud 45, said roller operating in the raceway formed by the spaced webs 21a and 21b which are secured to the eccentric 21.

An interchangeable knife blade 46 is mounted on the lower end of the knife arm 26 to transversely cut the vines held down by the rollers 23—24, the point of the blade 46 being adjusted to travel just beneath the vines during the cutting stroke, that is, adjusted somewhat lower than the lower edge of the rollers 23—24 between which the knife operates. The knife blade 46 is single acting, and during the return stroke or recovery stroke is raised above the vines due to the action of roller 44 in the camway 21a, 21b, and the pivot bearing 42.

The engagement of roller 44 in the raceway or eccentric 21, and the action of stud 43a, causes the lower end of knife 46 to travel in a fixed orbit, the shape of the cam raceway 21a, 21b, being such that the knife will be driven straight across the row of vines between the rollers 23—24 when on the cutting stroke, but the knife will be raised above the vines on the return stroke, the knife being operated faster than the movement of the cutter frame across the ground.

Secured to the side members 15 of the cutter frame, in advance of the roller 24 are hangers or brackets 47 for supporting the longitudinal shaft 48 for the longitudinal cutter disks 25, and the fingers 49. Shaft 48 is journaled in bearings 50 on the brackets 47 parallel with and in advance of the rollers 23 and 24. A sprocket wheel 51 is secured to shaft 48, and a chain 52 runs around a sprocket 51 and over a sprocket 53 on shaft 23a of roller 23, whereby the disk shaft 48 will be rotated positively by and with rollers 23 and 24.

Extending forwardly and downwardly from the lower ends of brackets 47 are fingers 49, the outer ends of which are adapted to pass under the vines which slide up over changeable blades 54 which extend substantially the full length of fingers 49, the blades 54 cutting the cross-vines at each side of the row as they slide up the inclined fingers.

In this manner most of the cross-vines of the rows are cut in a path just inside the ends of the ground rollers. Any vines however not cut by the blades 54 will be cut by the circular disk cutters 25 rotating on the shaft 48, the circular disks having beveled edges which cooperate with the upper ends of the blades 54 in much the same manner as the members of a pair of scissors. Circular disk cutters 25 cut any vines which have not already been severed by sliding upon the blades 54 carried by fingers 49.

In my present machine the reciprocating knife 46, and also the circular disk cutters 25 are driven positively by and with the corrugated land rollers 23 and 24 of the cutter frame by means of the chain and sprocket drives, both rollers contributing to the required traction. The flat spring mounting 28 for rear roller 24 permits a slight vertical yielding with respect to the front roller 23 whereby any unevenness in the ground will not cause either roller to rise above the ground at any time. The cutter frame may be readily shifted on the cultivator frame by means of the manually rotatable shaft 17 to adjust the cutter frame to any inequalities or unevenness in the rows; also the differential drive shown in my Patent 1,857,006 has been dispensed with in the present machine, and the bevel gears 37—38 inserted in place thereof, thereby simplifying the construction; also the use of the rotary cam 21 and the roller 44, and the sliding bearings 42—43 in the knife arm 26, operate the reciprocating knife in a positive, simple, and efficient manner.

I claim:—

1. In a machine of the character specified; a wheeled supporting frame; a wheeled cutter frame slidably mounted on the supporting frame; means for shifting the cutter frame laterally of the supporting frame; cutting mechanism carried by the cutter frame; and driving connections between the cutting mechanism and the cutter frame wheels.

2. In a machine as set forth in claim 1, said means comprising a shaft rotatably journaled on the supporting frame; and flexible connections between the shaft and cutter frame whereby the latter will be shifted as the shaft is rotated.

3. In a machine as set forth in claim 1, said means comprising a manually rotatable shaft journaled on the supporting frame; and a flexible cable wrapped around the shaft with the center of the wrapping secured thereto, and the ends of the cable being connected with opposite sides of the cutter frame.

4. In a machine as set forth in claim 1, said cutter frame being slidably mounted on a cross bar on the supporting frame; and said shifting means comprising a manually rotatable shaft journaled on the supporting frame; and a flexible cable wrapped around the shaft with the center of the wrapping secured thereto, and the ends of the cable being connected with the opposite sides of the cutter frame.

5. In combination with a machine as set forth in claim 1, independent means for raising and lowering each side of the supporting frame to maintain the cutter frame wheels engaged with the ground.

6. In a machine of the character specified, a wheeled supporting frame; a hinged cutter frame pivoted on the supporting frame; spaced ground rollers journaled in the cutting frame; cutting mechanism carried by the cutting frame; and driving connections between the cutting mechanism and the ground rollers.

7. In a machine as set forth in claim 6, one roller having its bearings fixed in the cutter frame; and bow springs carrying the bearings for the other roller, for the purpose specified.

8. In a machine as set forth in claim 6, said cutting mechanism comprising a vertical reciprocating knife arm intermediate the ground rollers; said arm having a slotted pivoted connection with the cutter frame; a camway rotated by said driving connections; a stud pin eccentrically mounted on the camway and engaging a slot in the knife arm; and a member on the knife arm engaging the camway.

9. In a machine as set forth in claim 6, said cutting mechanism comprising a vertical reciprocating knife arm intermediate the ground rollers; said arm having a slot; a fixed pin on the cutter frame engaging the slot; said knife arm having a second slot therein; a camway rotated by said driving connections; a stud pin eccentrically mounted on the camway and engaging said second slot; and a member on the knife arm engaging the camway.

10. In a machine as set forth in claim 6, said cutting mechanism comprising a vertical reciprocating knife arm intermediate the ground rollers; said arm having a slot adjacent its upper end; a fixed pin on the cutter frame engaging the slot; a shaft disposed axially of the cutter frame and rotated by the driving connections; a camway mounted on said shaft adjacent the knife arm; said knife arm having a second slot therein adjacent its center; a stud on the camway offset from said shaft and engaging said second slot; and a member on the knife arm engaging the camway.

11. In a machine as set forth in claim 6, said cutting mechanism comprising a vertically disposed reciprocating knife arm intermediate the ground rollers; said arm having a slot in its upper end; a slide bearing in the slot pivoted on the cutter frame; a shaft disposed axially of the cutter frame and rotated by the driving connections; an eccentric fixed on said shaft adjacent the knife arm; a fixed stud on the eccentric offset from the shaft; said knife arm having a second slot therein adjacent its center; a slide bearing in said second slot mounted on said stud; a camway fixed on the eccentric; and a roller on the knife arm engaging the camway.

12. In a machine as set forth in claim 6, said cutting mechanism comprising spaced parallel fingers on the front end of and at opposite sides of the cutter frame; said fingers being directed forwardly and downwardly to substantially the ground surface; knife blades mounted on the fingers having their cutting edges uppermost; disk cutters rotated by the driving connections and cooperating with the rear ends of the knife blades.

13. In a machine as set forth in claim 6, said cutting mechanism comprising spaced parallel fingers on the front end of and at opposite sides of the cutter frame, said fingers being directed forwardly and downwardly to substantially the ground surface; knife blades mounted on the fingers having their cutting edges uppermost; a shaft journaled at the rear ends of the fingers and rotated by the driving connection, and disk cutters mounted on said shaft cooperating with the rear ends of the knife blades.

14. In a machine of the character specified; a wheeled supporting frame; a hinged cutter frame pivoted on the supporting frame; spaced ground rollers journaled in the cutting frame; a vertical reciprocating knife intermediate the ground rollers; means for moving the knife to cut the material held down by the rollers; longitudinal cutters in advance of the rollers at opposite sides of the cutting frame to cut the material longitudinally of the cutter frame; and driving connections from the ground rollers to the knife arm moving means and to the longitudinal cutters respectively.

15. In a machine as set forth in claim 14, said knife being mounted on an arm having a slotted connection with the cutter frame; and said moving means comprising a camway rotated by said driving connections; an offset stud on the camway engaging a slot in the knife arm; and a member on the knife arm engaging the camway.

16. In a machine as set forth in claim 14, said knife being mounted on an arm having a slot adjacent its upper end; a fixed pin on the cutter frame engaging the slot; said knife arm having a second slot therein adjacent its center; and said moving means comprising a shaft disposed axially of the cutter frame and rotated by the driving connections; a camway fixed on said shaft; an offset stud on the camway engaging said second slot; and a member on the knife arm engaging the camway.

17. In a machine as set forth in claim 14, said longitudinal cutters comprising parallel fingers in advance of the rollers and disposed at opposite sides of the cutter frame, said fingers being directed forwardly and downwardly to substantially the ground surface; knife blades mounted on the fingers having their cutting edges uppermost; and disk cutters driven by the driving connections cooperating with the rear ends of the knife blades.

18. In a machine as set forth in claim 14, said longitudinal cutters comprising parallel fingers in advance of the rollers and disposed at opposite sides of the cutter frame, said fingers being directed forwardly and downwardly to substantially the ground surface; knife blades mounted on the fingers having their cutting edges uppermost; a shaft journaled at the rear ends of the fingers and driven by the driving connections; and disk cutters mounted on said shaft cooperating with the rear ends of the knife blades.

19. In combination with a machine as set forth in claim 14, means for shifting the cutter frame laterally of the supporting frame.

20. In a machine as set forth in claim 14, one ground roller having its bearings fixed in the cutter frame; and bow springs carrying the bearings of the other roller for the purpose specified; and said driving connections comprising chain and sprocket drives between the rollers, and between one roller and the knife moving means, and between said roller and the longitudinal cutters.

WARREN A. SERIGHT.